United States Patent [11] 3,627,127

[72] Inventor Scott Cunningham Whiteford
    Highscape, Bayleys Hill, Nr. Sevenaaks,
    Kent, Croydon, England
[21] Appl. No. 883,423
[22] Filed Dec. 9, 1969
[45] Patented Dec. 14, 1971

[54] SORTING APPARATUS
    8 Claims, 4 Drawing Figs.
[52] U.S. Cl. .................................................... 209/121
[51] Int. Cl. .................................................... B07c 5/16
[50] Field of Search .......................................... 209/74,
    121; 177/25, DIG. 18; 235/58, 61

[56] References Cited
    UNITED STATES PATENTS
3,291,232   12/1966   Bell .............................. 235/58 X
3,446,299   5/1969    Leonowicz ..................... 177/25
3,460,673   8/1969    Sanner ........................... 209/74

Primary Examiner—Allen N. Knowles
Assistant Examiner—Gene A. Church
Attorney—Kurt Kelman ABSTRACT: The invention relates to a channelizer or apparatus for sorting articles such as prepacked foodstuffs into channels each characterized by an individual weight band. The apparatus of the invention includes a weighting unit that weighs each article and produces information significant of the article weight that is transferred step by step through a train of preset registers storing channel weight band information until the transferred information agrees with the stored information. This agreement is effective to cause transfer of the article to the channel to which the stored information relates.

Inventor
SCOTT C. WHITEFORD
By [signature]
AGENT

SORTING APPARATUS

This invention concerns sorting apparatus of the kind adapted to respond to a selected physical characteristic of each of a series of articles and to distribute such articles amongst channels each significant of a particular value or value range of the characteristic in question. Such apparatus may conveniently be termed a "channelizer" and will be so called herein.

The invention is more particularly concerned with a channelizer that is adapted to sort articles in accordance with their individual weights, for instance for the pricing of prepacked foodstuffs in accordance with the weight of a pack. The object of the invention is to provide a channelizer for such purpose that may reliably a fast rate into a relatively large number of channels each significant of an article weight range that may be limited by weight values selected arbitrarily to coincide with monetary or other values that bear a selected relationship to the weight of a sorted article.

A channelizer in accordance with the invention comprises a conveyor for articles to be sorted, a plurality of channels and transfer means associated with each channel for transferring an article from said conveyor to an individual channel; a weighing unit for sensing the weight of each article carried by the conveyor and adapted for producing a signal significant of the weight thereof; a register associated with each transfer means and adapted to store a signal significant of the weight range characteristic of the related channel; sequence means synchronized with movement of articles by said conveyor for activating each register as an individual article coincides with the transfer means associated with said register; and a coincidence detector for comparing the signal from the weighing unit with the associated stored register signal and for actuating the related transfer means when the weight-significant signal of an article coincident with said transfer means matches the related stored register signal.

Preferably the registers comprise digital stores, e.g., binary digital stores, and the signal produced by the weighing unit is digitized for comparison with a stored digital register signal by the related coincidence detector. Thus conveniently, an analogue weight signal, e.g., a voltage signal, is produced by the weighing unit and digitized by a digital counter that receives input pulses under the control of a comparator that compares the weight signal with the output of a digital/analogue converter reading the counter state.

The apparatus desirably includes a scaling unit that transforms weight signals in a preselected manner whereby the transformed signal may be digitized in terms of arbitrarily selected units, for example, price units. Thereby, each channel may be arranged to receive articles having a weight range that is delimited by the selected units which, if price units, means that each channel will receive articles of a value range delimited by convenient units of monetary value.

A channelizer in accordance with the invention may be associated with labelling equipment adapted to label each sorted article so as to show thereon its weight and/or price and/or other information related to the channel into which the article is transferred.

A typical embodiment of the invention will be described in relation to the accompanying drawings, in which.

Figure 1:
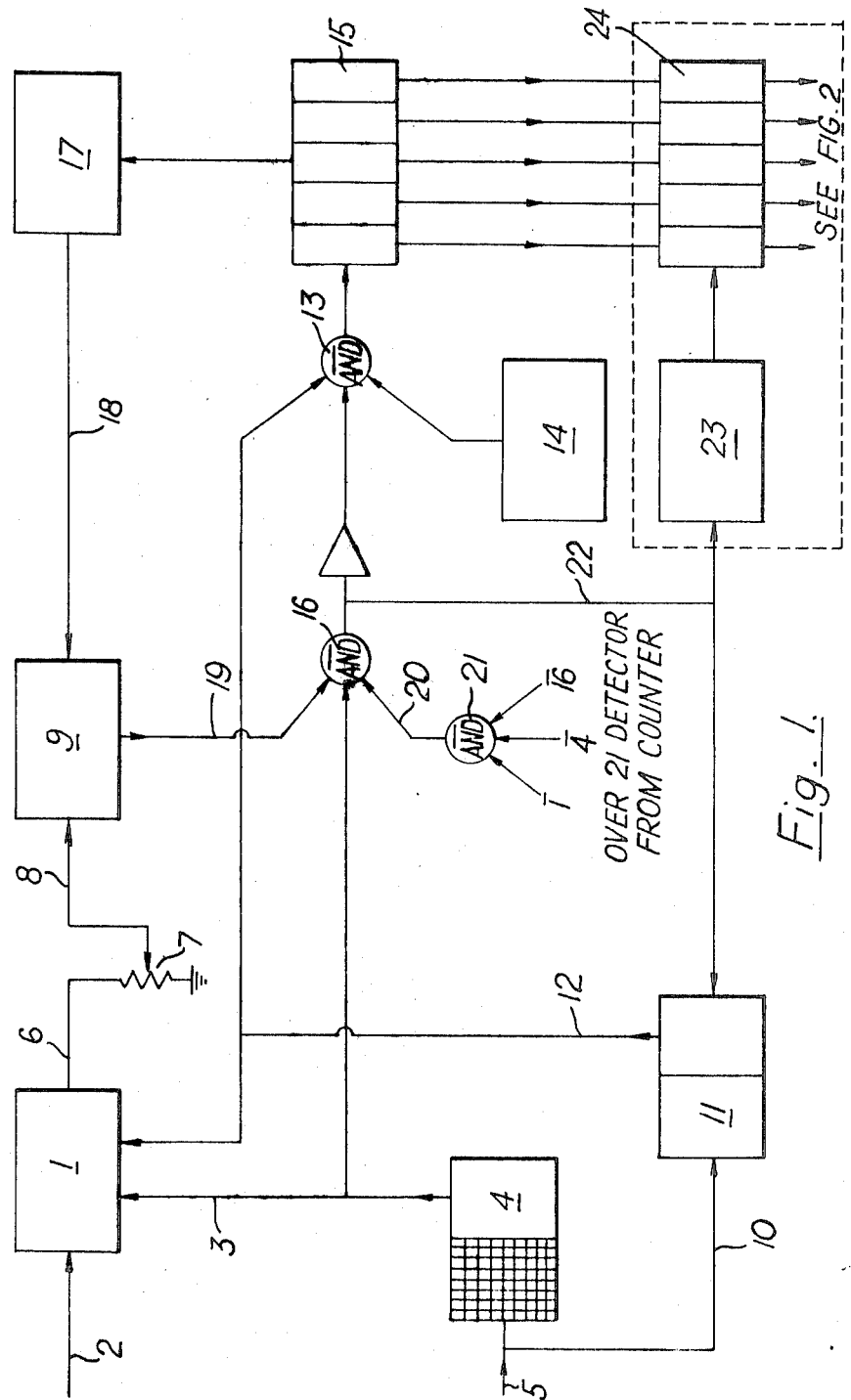
FIG. 1 is a schematic block diagram illustrating certain units of a channelizer according to the invention.

In a typical embodiment of the invention such as that illustrated in the drawings, articles to be sorted such as prepacked foodstuffs, are carried by a conveyor successively past a weighing unit. As an article passes said unit, a voltage signal significant of its weight is generated and, during a short sample period, that signal integrated and stored. The stored signal is then transformed by a scaling unit and sent to a voltage comparator while a clock generator is started. The clock generator supplies a train of pulses to a binary counter and a digital/analogue converter reads the counter and presents to the comparator a voltage that is proportional to the state of the counter. When the input voltage from the scaling unit and the voltage from the converter reach equality, signifying a counter state that is a digitized representation of the input voltage, the comparator stops the clock generator.

The conveyor and the mechanical components of the equipment are not illustrated in detail since these may take a variety of forms, as will be apparent to those familiar with article-sorting mechanisms and indeed will be designed so as to be suitable for handling articles of the particular type to be sorted by an equipment in accordance with the invention. The conveyor may for instance comprise a guideway along which the articles are propelled by pegs or slats on a suitably intermittently driven endless chain. Preferably the conveyor is formed in two parts, the first part (feed conveyor) being adapted to feed articles one at a time to a platform associated with the weighing unit, and a second part (output conveyor) that is adapted to convey the articles from such platform past a series of lateral channels each having a suitable actuator constituting the said transfer means and adapted to displace an article on the output conveyor into its associated channel in response to a signal as hereinafter described. The actuators may be electrically operated (e.g., solenoid thrustors) or pneumatic or hydraulic ram assemblies with electric control of their operation.

The weighing unit is preferably of the strain gauge type, the platform being supported on a suitable beam system the deflection of which under load is measured electrically by strain gauges, since this arrangement can be designed to produce accurate weight-significant outputs with very small platform displacements and, consequently, rapid response so permitting a high rate of article sorting to be accomplished.

Referring to FIG. 1 of the drawings, this shows an integrator 1 that receives over line 2 from the weighing unit the output voltage generated by the latter and integrates this voltage during a sampling period. The operation of the integrator 1 is controlled by an input clamp circuit 3 in turn controlled by an integrator control unit 4 that responds to the presence of an article on the platform of the weighing unit. In the present embodiment, a photocell is arranged to produce a signal on line 5 when an article is fed, by the feed conveyor, onto the platform of the weighing unit, the signal on line 5 being arranged, after a suitable delay, to deactivate the clamp circuit 3 and so permit the integrator 1 to respond to the voltage on line 2 for the sampling period that is determined by the unit 4.

The delay between arrival of a signal on line 5 and the commencement of the sampling period is so selected, in accordance with the response characteristic of the weighing unit, that the "first overshoot" of the weighing unit signal voltage beyond the level corresponding to the exact weight of the article and due to inertia, does not fall within the sampling period. Accordingly, the integrator 1 is only activated for a sampling period (for instance 50 ms.) in which the deviation of the voltage on line 1 from a mean value corresponding to the true weight of the article is small and rapidly decreasing. The integrator 1 is thus enabled to produce an output (on line 6) that reflects the true weight of the article to a high degree of accuracy.

FIG. 1 also shows (diagrammatically) a potentiometer 7 that constitutes the said scaling unit which reduces the output voltage on line 6 to a value that is a selected proportion of the line 6 voltage. The scaling unit 7 is set in accordance with, for instance, the price per unit weight of the articles being sorted so that the reduced voltage is significant of the value of an article having a weight represented by the output voltage on line 6. This reduced voltage is applied over line 8 to the input of a comparator 9.

Also as shown in FIG. 1, the signal on line 5 that initiates operation of the integrator 1 (after said delay) is also conducted over line 10 to a clock generator control unit 11. The latter, in response to such signal on line 10, establishes an output voltage on a line 12 which transmits this voltage both to the integrator 1 and to an "AND" gate 13. The voltage transmitted to the integrator "zeros" the output of the latter prior to commencement of the sampling period while the voltage transmitted to the gate 13 prepares this to pass clock pulses from a clock generator 14 to a binary counter 15. The line 3 from the unit 4 also extends, via a further "AND" gate 16, to the gate 13 whereby, at the commencement of the sampling period the gate 13 is opened and clock pulses are applied to the counter 15.

The counter 15 has duplicated outputs one set of which is connected to a digital/analogue converter 17 that generates a voltage on its output line 18 corresponding to the instantaneous state of the counter 15. This voltage on line 17 is applied to the comparator 9 which compares this voltage with that on line 8 and so long as there is a difference between the voltages on lines 8 and 17 applies a gate-opening voltage over line 19 to an input of gate 16.

Thus the voltage on line 3 during the sampling period holds gate 16 open so long as there is a voltage difference between line 8 and 17 and therefore clock pulses are accumulated by the counter 15 until this displays, by voltages on its outputs, a stored count significant of the voltage on line 8; that is, in the case considered, a count significant of the value of the article then on the platform of the weighing unit.

In the embodiment to which the drawings relate, a counter state representing more than 21 received clock pulses signifies an overweight article that is to be specially handled. For this reason, the gate 16 has a third input (line 20) from an "AND" gate 21 connected to the appropriate counter outputs so that if the counter state exceeds the value of 21 received clock pulses the gate 16 is closed regardless of the voltage then appearing on line 19 from the comparator 9.

When gate 16 closes and voltage thereby removed from its output, this fact is also transmitted by a line 22 connected both to a first shift pulse generator 23 and to a resetting connection on the unit 11; the latter is reset to remove the voltage on line 12 while the generator 23 produces a pulse adapted to read out the state of counter 15 and to transfer this to a first buffer register 24. This readout also resets the counter 15 to zero.

As above described, the conveyor is intermittently driven and in the case of a two-part conveyor as described, the output conveyor part thereof is intermittently advanced through steps equivalent to the separation of the channels along the path of this conveyor. In general, the first channel will be more than one step from the weighing unit platform and the equipment will include buffer registers equal in number to the output conveyor steps between the weighing unit platform and the first channel. As explained above, the first buffer register 24 receives the state of counter 15 while an article is on the platform of the weighing apparatus: the information represented by this counter state is transferred to the second and successive buffer registers in synchronism with the movement of the output conveyor and it will be apparent that this information will reach the final buffer register when the article to which the information relates is one step from the first channel.

Figure 2:
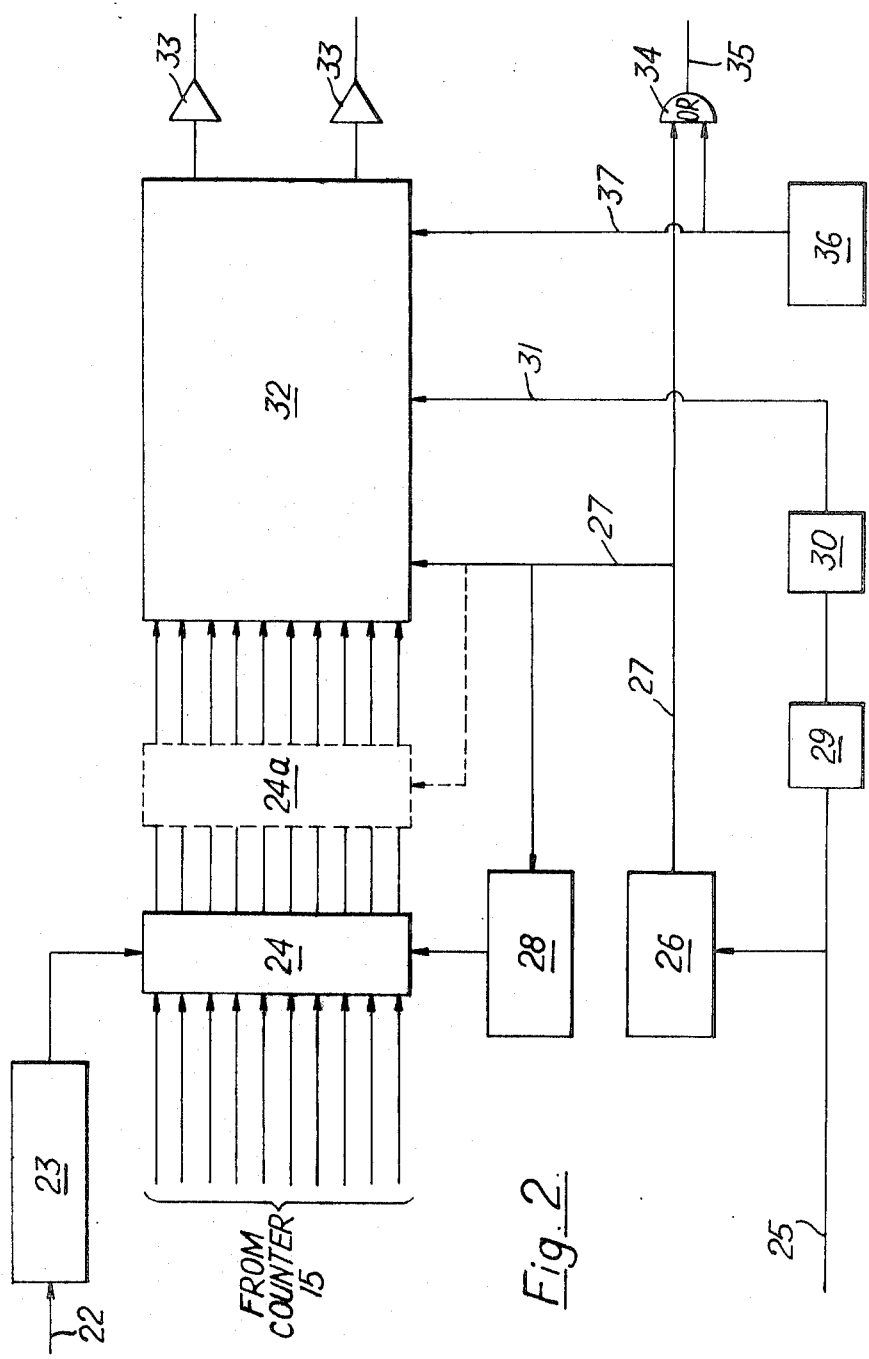
FIG. 2 is a block diagram illustrating further units of the channelizer.

In the embodiment shown in the drawings, there are in fact two buffer registers, the second being shown at 24a in FIG. 2.

The equipment further comprises a binary register associated with each channel. Each such register is associated with a coincidence detector and is preset to a state significant of, e.g., the value of the articles to be transferred to the related channel.

A sensing device (not shown), in this instance a magnetic proximity switch, detects the presence of an article on the output conveyor in the first position reached by that article after leaving the weighing unit platform. This sensing device produces a voltage pulse on line 25 (FIG. 2) that activates a second shift pulse generator 26. The latter produces a pulse on line 27 that is applied to each buffer register and to each said binary register to transfer the information in the first buffer register to the second and so on, the information in the final buffer register to the binary register associated with the first channel, and so on to the binary registers associated with the second and subsequent channels. The pulse on line 27 also goes to a zeroing pulse generator 28 which produces a pulse effective to zero the register 24 as soon as its state has been transferred to the second buffer register 24a.

Thus as an article travels on the output conveyor, information as to the value of that article is transferred step by step through the successive buffer registers and then through the binary registers associated with the successive output channels, the information reaching the binary register associated with any given channel as the article reaches a position to be transferred to that channel.

When an article reaches a channel into which it is required to be transferred, the value-significant information relating to the article will correspond with the presetting of the binary register of that particular channel and to which register such information will have been transferred as the article came into position for transfer to that channel. information relating to the article As shown in FIG. 2, the voltage pulses on line 25 also go via delay and timing circuits 29, 30 to an interrogation circuit 31 of each binary register (the block 32 in FIG. 2 represents all the binary registers and their coincidence detectors); in the case of any such register which at this time is preset to a state corresponding to the value-significant information that has just been transferred to that register, the associated coincidence detector responds and actuates the transfer mechanism (via drives indicated at 33 in FIG. 2) of the corresponding channel. Thereby all articles on the output conveyor that are in a position to be transferred to a desired channel are so transferred.

It will be noted in FIG. 2 that the line 27 extends to an "OR" gate 34 which is also connected to a pulse generator 36, whereby a pulse on line 27 or from the generator 36 will be transmitted to a line 35 that extends to the digital/analogue converter 17. The generator 36 is also connected by a line 37 to the registers comprising the block 32. A pulse on line 35 is effective to zero the converter 17 while a pulse on line 37 is effective to zero the registers of block 32.

Thus, during normal operation the pulse on line 27 that accomplishes transfer of information from one register to another as hereinabove explained is also effective to zero the converter 17 to prepare this for its next conversion operation.

The pulse generator 36 is arranged to produce a pulse whenever the equipment is switched on after a shutdown and it will be seen that this pulse zeros the converter 17 in the event that it had not been zeroed prior to shutdown and, also, the registers of block 32 are zeroed to preclude the subsequent transfer of information being disturbed by spurious information retained or introduced by switching transients on shutdown.

Figure 3:
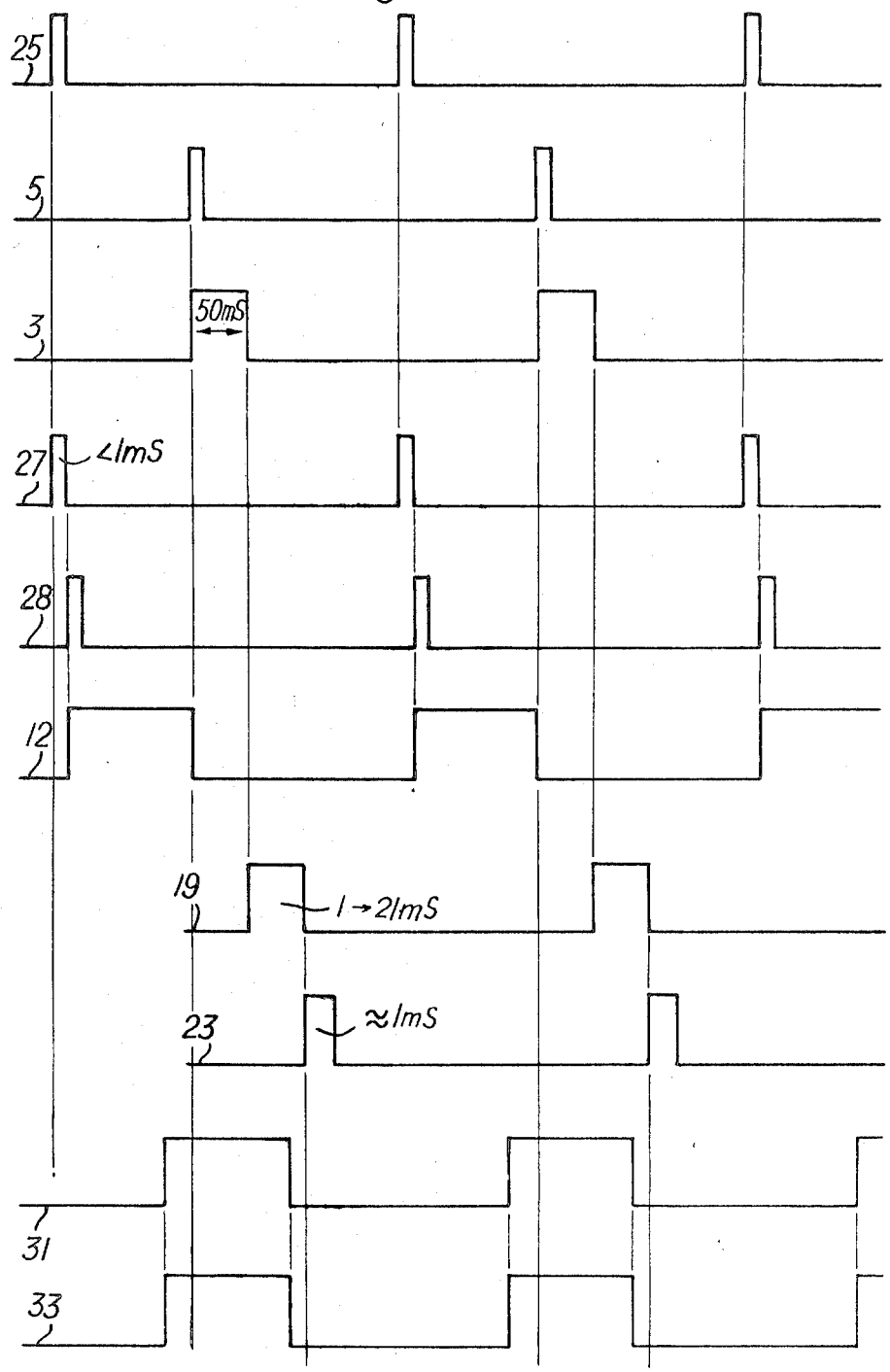
FIG. 3 is a timing diagram illustrating the operational sequence of the units of the channelizer.

FIG. 3 illustrates diagrammatically the timing of the various functions of the equipment. The respective horizontal lines represent voltages or functional states, as the case may be, of various components against a common horizontal time scale. The lines in the drawing are marked with the references used in FIGS. 1 and 2: for example the top line is marked 25 and shows the voltage state of line 25 in FIG. 2.

The importance of the scaling unit 7 in the described embodiment should be noted. Since there is conversion of an analogue voltage to a binary code, by use of the scaling unit each unit of that code can be made to represent either a discrete increment of weight or of price. If, as may be the case, the coded signal is used for the control of a weight/price computing printer, considerable advantage is to be gained both in reliability and simplicity. For example, by appropriate scaling, a particular code may represent 7¾ oz. and 2s. 11½d. and the code may thus be used directly to program print wheels in a fairly simple manner, avoiding conversion of weight analogue information to the lowest increment (say 7¾ oz. to 62 pulses each representing ⅛ oz), conversion of price/lb. information to the lowest increment (say 54d./lb. to 108 pulses each representing ½d.), multiplying the two together, dividing by 128 (⅛ oz. in 1lb), dividing by 2 to convert to pence, dividing by 12 to convert to shillings and so on.

Figure 4:
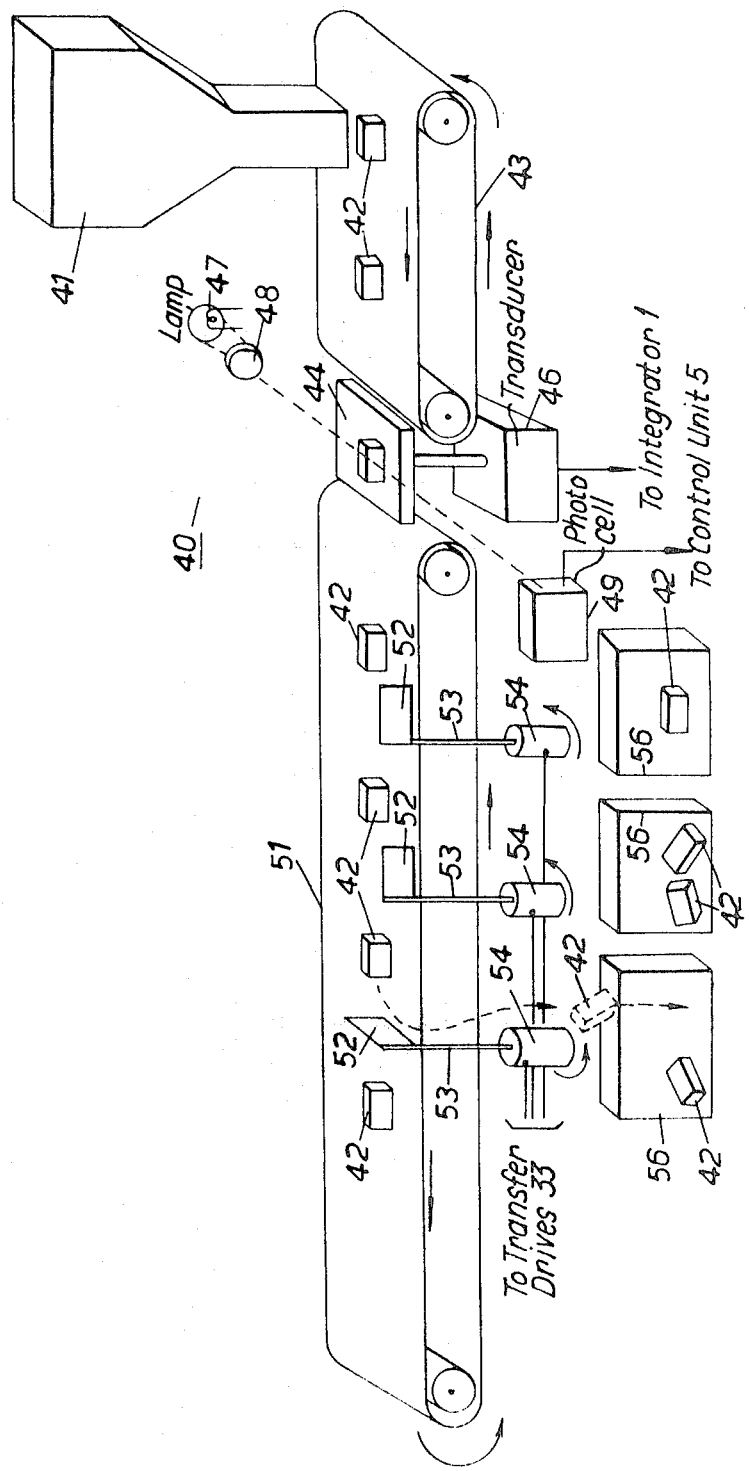
FIG. 4 is a partially schematic, partially diagrammatic isometric view of an illustrative channelizer according to the invention.

FIG. 4 depicts, in a very general way, an illustrative channelizer according to this invention. As shown, channelizer 40 comprises a hopper 41 which intermittently feeds workpieces 42, for example, prepacked food such as cheese and cooked meats, onto a continuously rotating conveyor belt 43, called the feed conveyor. As the belt 43 rotates, it advances successive workpieces 42 onto the platform 44 of a weighing transducer 46, the output thereof being connected to integrator circuit 1 in FIG. 1. As a workpiece arrives on platform 44 it interrupts the light beam from a lamp 47 and a lens 48 to a photocell 49, thereby signalling its arrival to control unit 5 in FIG. 1. After the workpiece on platform 44 has been weighed, it is passed to a second conveyor belt 51 where it is advanced past a plurality of actuators 52 rotatably mounted on the shafts 53 of a corresponding plurality of solenoid thrusts 54. The armatures of motors 54 are connected to the transfer drives 33 (FIG 1) and when a given motor is energized to rotate the corresponding actuator, the workpiece positioned proximate that actuator is deflected off conveyor 51 to fall into a storage bin 56, as discussed with reference to FIGS. 1–3.

I claim:
1. A channelizer comprising:
   a. a conveyor for articles to be sorted;
   b. a plurality of channels;
   c. transfer means associated with each said channel for transferring an article from said conveyor to an individual channel;
   d. a weighing unit for sensing the weight of each article carried by the said conveyor and adapted for producing a signal significant of the weight thereof;
   e. a register associated with each said transfer means and adapted to store a signal significant of the weight range characteristic of the related channel;
   f. sequence means synchronized with movement of articles by said conveyor for activating each said register as an individual article coincides with the said transfer means associated with said register; and
   g. a coincidence detector for comparing the signal from the said weighing unit with the associated stored register signal and for actuating the related transfer means when the weight-significant signal of an article coincident with said transfer means matches the related stored register signal.
2. The channelizer of claim 1 in which each said register comprises a digital store and the signal produced by the said weighing unit is digitized for comparison with a stored digital register signal by the related said coincidence detector.
3. The channelizer of claim 2 in which an analogue weight signal is produced by the said weighing unit and digitized by a digital counter that receives input pulses under the control of a comparator that compares the weight signal with the output of a digital/analogue converter reading the counter state.
4. The channelizer of claim 3 in which said weighing unit produces an electrical signal significant of article weight, the apparatus including means for integrating a sample of said signal during a period of commencing subsequent to the first overshoot of the said signal.
5. The channelizer of claim 1, including a scaling unit for transforming weight signals into signals significant of value, said registers storing signals significant of the values of articles to be sorted into the respective channels.
6. The channelizer of claim 5 in which said weighing unit produces a voltage signal significant of article weight and said scaling unit comprising a voltage divider.
7. The channelizer of claim 6 including means for integrating a sample of said voltage signal during a period commencing subsequent to the first overshoot of the said signal and in which said scaling unit is adapted to receive and divide a voltage signal produced by said integrating means.
8. The channelizer of claim 1 including labelling equipment responsive to weight-significant signals derived from said weighing unit and adapted to label each article with information related to the channel to which it is to be transferred.

* * * * *